(12) United States Patent
Tsumura et al.

(10) Patent No.: US 11,424,698 B2
(45) Date of Patent: Aug. 23, 2022

(54) MOTOR CONTROL DEVICE AND AIR-CONDITIONING DEVICE

(71) Applicant: Mitsubishi Electric Corporation, Tokyo (JP)

(72) Inventors: Akihiro Tsumura, Tokyo (JP); Yuichi Shimizu, Tokyo (JP); Yasuhiko Wada, Tokyo (JP); Junji Morimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/294,466

(22) PCT Filed: Jan. 16, 2019

(86) PCT No.: PCT/JP2019/001093
§ 371 (c)(1),
(2) Date: May 17, 2021

(87) PCT Pub. No.: WO2020/148825
PCT Pub. Date: Jul. 23, 2020

(65) Prior Publication Data
US 2022/0021318 A1    Jan. 20, 2022

(51) Int. Cl.
*H02P 5/74* (2006.01)
*H02P 5/46* (2006.01)
*H02P 27/06* (2006.01)

(52) U.S. Cl.
CPC .......... *H02P 5/74* (2013.01); *H02P 5/46* (2013.01); *H02P 27/06* (2013.01)

(58) Field of Classification Search
CPC ...... H02P 1/00; H02P 1/04; H02P 1/10; H02P 1/12; H02P 1/18; H02P 1/16; H02P 1/163;
(Continued)

(56) References Cited

U.S. PATENT DOCUMENTS

2006/0192506 A1*  8/2006  Miffit .................. B62K 9/02
                                                            318/55
2020/0244194 A1    7/2020  Masumura et al.

FOREIGN PATENT DOCUMENTS

JP    2004-350385 A     12/2004
WO    2018/185878 A1    10/2018

OTHER PUBLICATIONS

International Search Report of the International Searching Authority dated Apr. 2, 2019 for the corresponding International application No. PCT/JP2019/001093 (and English translation).

* cited by examiner

*Primary Examiner* — Antony M Paul
(74) *Attorney, Agent, or Firm* — Posz Law Group, PLC

(57) ABSTRACT

A motor control device includes: an inverter circuit configured to convert a direct-current voltage into an alternating-current voltage, and to supply the alternating-current voltage to a plurality of motors connected in parallel; current detectors configured to detect motor currents flowing through the respective motors; a relay provided between at least one of the plurality of motors and the inverter circuit; and a controller configured to change the number of motors to be driven. When one of two or more motors under driving is stopped, the controller lowers a current instruction value to the two or more motors under driving. When a monitor current that is the motor current detected by the current detector of the motor connected to the relay is decreased, the controller switches the relay from an on state to an off state.

11 Claims, 11 Drawing Sheets

(58) Field of Classification Search
CPC .... H02P 1/24; H02P 1/265; H02P 1/26; H02P 1/42; H02P 1/423; H02P 1/46; H02P 1/465; H02P 3/00; H02P 3/08; H02P 3/18; H02P 3/22; H02P 3/26; H02P 6/00; H02P 6/12; H02P 6/06; H02P 6/24; H02P 6/26; H02P 6/28; H02P 6/32; H02P 7/00; H02P 7/245; H02P 8/24; H02P 9/00; H02P 9/107; H02P 21/00; H02P 21/0021; H02P 21/22; H02P 23/00; H02P 25/062; H02P 25/064; H02P 25/18; H02P 27/00; H02P 27/04; H02P 27/06

See application file for complete search history.

MOTOR CONTROL DEVICE AND AIR-CONDITIONING DEVICE

CROSS REFERENCE TO RELATED APPLICATION

This application is a U.S. national stage application of PCT/JP2019/001093 filed on Jan. 16, 2019, the contents of which are incorporated herein by reference.

TECHNICAL FIELD

The present disclosure relates to a motor control device controlling driving of a motor, and to an air-conditioning device.

BACKGROUND ART

In order to drive a compressor and a fan, a related-art air-conditioning device includes an inverter circuit that supplies an alternating-current voltage of an optional frequency to a motor, and supplies the alternating-current voltage to the motor to control a rotation speed of the motor. In the motor mounted on the air-conditioning device, importance is placed on enhancement in efficiency for reduction of power consumption. Therefore, as the motor mounted on the air-conditioning device, for example, a permanent magnet synchronous motor in which a permanent magnet is disposed in a rotor structure is often used.

An air-conditioning device including a plurality of motors to drive a motor having a large capacity along with increase in air-conditioning capacity has been known. An air-conditioning device that drives motors connected to a plurality of fans by one inverter circuit has been proposed (for example, see Patent Literature 1). In the air-conditioning device disclosed in Patent Literature 1, a switch such as a relay is provided between the inverter circuit and each of the motors, and each of the switches is turned on or off to obtain a necessary air volume. Further, a motor parallel driving method that controls a relay provided between an inverter circuit and each of motors, to change the number of motors to be driven among the plurality of motors has been disclosed (for example, see Patent Literature 2).

CITATION LIST

Patent Literature

Patent Literature 1: International Publication No. WO2018/185878
Patent Literature 2: Japanese Unexamined Patent Application Publication No. 2004-350385

SUMMARY OF INVENTION

Technical Problem

In the technologies disclosed in Patent Literature 1 and Patent Literature 2, in a case where a contact is turned off in a state where a current flows through the relay, an arc occurs on the contact of the relay, which applies stress to the relay. The relay may be broken down by the stress.

The present disclosure is made to solve the above-described issues, and an object thereof is to provide a motor control device and an air-conditioning device that prevent failure of devices including a relay when the number of motors to be driven is changed.

Solution to Problem

A motor control device according to one embodiment of the present disclosure includes: an inverter circuit configured to convert a direct-current voltage into an alternating-current voltage, and to supply the alternating-current voltage to a plurality of motors connected in parallel; current detectors configured to detect motor currents flowing through the respective motors; a relay provided between at least one of the plurality of motors and the inverter circuit and configured to switch an on state and an off state of connection between the one motor and the inverter circuit; and a controller configured to change number of motors to be driven out of the plurality of motors, in which the controller includes an inverter control unit and a number-of-motors change unit, the inverter control unit lowering, when one of two or more motors under driving is stopped, a current instruction value to the two or more motors under driving, and the number-of-motors change unit switching, when a monitor current that is the motor current detected by the current detector of the motor connected to the relay is decreased, the relay connected to a motor to be stopped, from the on state to the off state.

A motor control device according to another embodiment of the present disclosure includes: an inverter circuit configured to convert a direct-current voltage into an alternating-current voltage, and to supply the alternating-current voltage to a plurality of motors connected in parallel; current detectors configured to detect motor currents flowing through the respective motors; a relay provided between at least one of the plurality of motors and the inverter circuit and configured to switch an on state and an off state of connection between the one motor and the inverter circuit; and a controller configured to change number of motors to be driven out of the plurality of motors, in which the controller includes an inverter control unit and a number-of-motors change unit, the inverter control unit making a rotation speed of a motor under driving smaller than a rotation speed instruction value when the number of motors to be driven is increased by one, the number-of-motors change unit switching, when a monitor rotation speed that is a rotation speed estimated from the motor current detected by the current detector of the motor under driving is less than the rotation speed instruction value, the relay connected to a motor to be activated, from the off state to the on state.

An air-conditioning device according to still another embodiment of the present disclosure includes: a refrigerant circuit through which refrigerant circulates, the refrigerant circuit including a compressor, a condenser, an expansion device, and an evaporator that are connected to one another; a fan configured to supply air to at least one of the condenser and the evaporator; the plurality of motors connected to one or both of the compressor and the fan; and any of the above-described motor control devices.

Advantageous Effects of Invention

According to the embodiments of the present disclosure, the plurality of motors are connected to the inverter circuit in parallel. Therefore, when the current flowing through the motor under driving is decreased, the currents flowing through the other motors and the relay are also decreased. The state of the relay is switched after the current flowing through the relay is decreased. This makes it possible to reduce the stress applied to the relay, and to prevent the device including the relay from breaking down.

DESCRIPTION OF EMBODIMENTS

Embodiment 1

Figure 1:
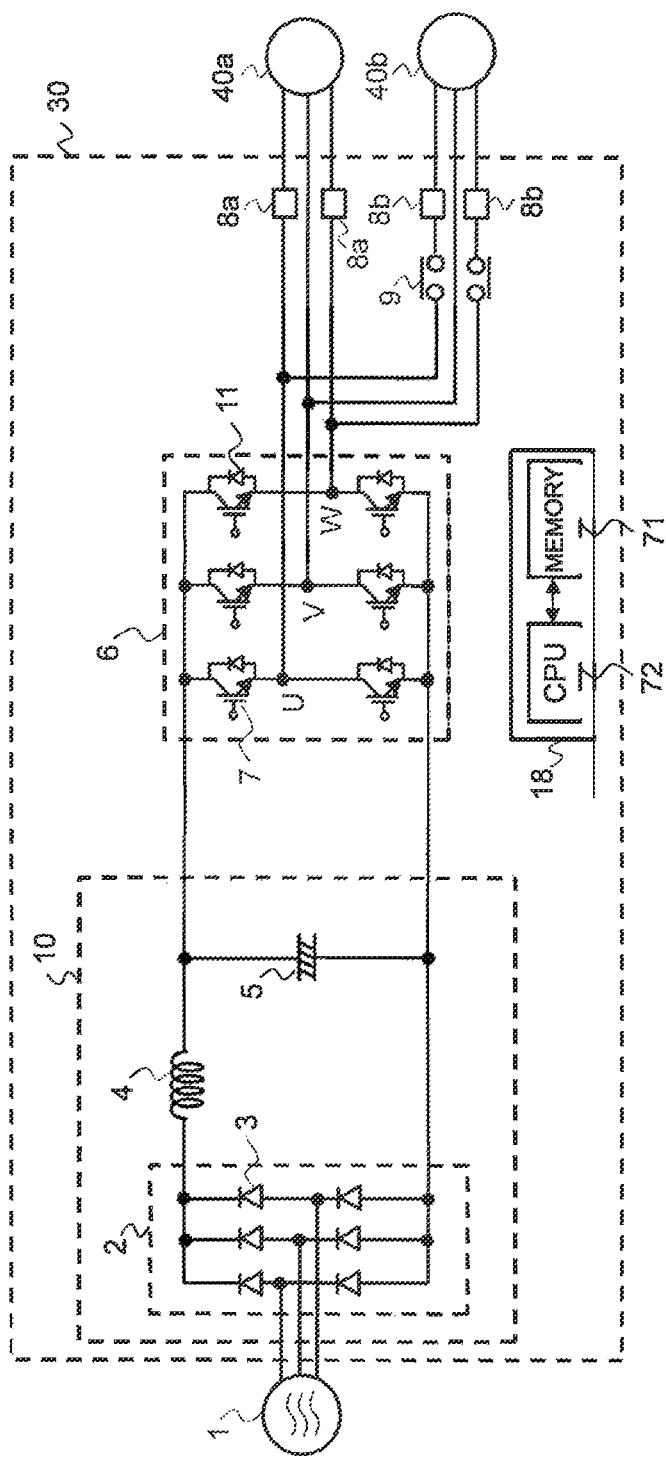
FIG. 1 is a block diagram illustrating a configuration example of a motor control device according to Embodiment 1 of the present disclosure.

A configuration of a motor control device of Embodiment 1 is described. FIG. 1 is a block diagram illustrating a configuration example of the motor control device according to Embodiment 1 of the present disclosure. A motor control device 30 is a device controlling driving of a plurality of motors 40a and 40b. In Embodiment 1, the motors 40a and 40b are permanent magnet synchronous motors. The motors 40a and 40b are provided in, for example, a compressor of an air-conditioning device.

The motors 40a and 40b may be connected to a load-side fan provided in an indoor unit or may be connected to a heat source-side fan provided in an outdoor unit, without limitation to the compressor of the air-conditioning device. In Embodiment 1, a case where the motors 40a and 40b are provided in the air-conditioning device is described; however, a device in which the motors 40a and 40b are provided is not limited to the air-conditioning device. Further, in Embodiment 1, a case where motors to be controlled are the two motors 40a and 40b is described; however, the motors to be controlled may be three or more motors.

As illustrated in FIG. 1, the motor control device 30 includes a power conversion circuit 10, an inverter circuit 6, and a relay 9. The power conversion circuit 10 converts an alternating current supplied from a three-phase alternating-current power supply 1 into a direct current. The inverter circuit 6 is connected to the plurality of motors 40a and 40b. The relay 9 is connected between the motor 40b and the inverter circuit 6. The motor control device 30 further includes a controller 18 controlling the inverter circuit 6 and the relay 9. The motors 40a and 40b are connected in parallel to an output side of the inverter circuit 6.

A wire connecting the inverter circuit 6 and a winding wire of the motor 40a is provided with a current detector 8a that detects a motor current Ima flowing from the inverter circuit 6 to the motor 40a. A wire connecting the inverter circuit 6 and a winding wire of the motor 40b is provided with a current detector 8b that detects a motor current Imb flowing from the inverter circuit 6 to the motor 40b.

The power conversion circuit 10 includes a rectifier circuit 2, a reactor 4, and a smoothing capacitor 5. The rectifier circuit 2 converts the alternating current into the direct current. The reactor 4 smooths a current output from the rectifier circuit 2. The smoothing capacitor 5 smooths a voltage output from the rectifier circuit 2. The rectifier circuit 2 includes backflow prevention elements 3 that rectify a flowing direction of the current to one direction. The power conversion circuit 10 outputs the direct-current power supply voltage stabilized by the rectification operation of the power conversion circuit 10, to the inverter circuit 6.

The inverter circuit 6 includes six switching elements 7 and freewheeling diodes 11 that are connected in parallel with the respective six switching elements 7. The switching elements 7 are, for example, power semiconductor elements such as insulated gate bipolar transistors (IGBTs). The six switching elements 7 are classified into two switching elements 7 connected to U-phase winding wires, two switching elements 7 connected to V-phase winding wires, and two switching elements connected to W-phase winding wires of the respective motors 40a and 40b.

The inverter circuit 6 receives the stable direct-current power supply voltage from the power conversion circuit 10. The inverter circuit 6 converts the direct-current power supply voltage into an alternating-current voltage by causing each of the six switching elements 7 to perform switching operation at an optional carrier frequency, and outputs the alternating-current voltage. The inverter circuit 6 outputs a variable voltage of a variable frequency to cause the motors 40a and 40b to perform variable speed operation.

The relay 9 switches an on state and an off state of the connection between the motor 40b and the inverter circuit 6. The relay 9 is, for example, an electromagnetic relay. In a case where the relay 9 is in the on state, the motor 40b is electrically connected to the inverter circuit 6. In a case where the relay 9 is in the off state, the motor 40b is electrically disconnected from the inverter circuit 6. In other words, in the case where the relay 9 is in the on state, the two motors 40a and 40b are driven. In the case where the relay 9 is in the off state, the motor 40b is stopped but the motor 40a is driven. The relay 9 has a function of changing the number of motors to be driven out of the two motors 40a and 40b. In the case where the relay 9 is the electromagnetic relay, when an exciting voltage is applied to a coil provided in the relay 9, the relay 9 is switched from the off state to the on state.

Figure 2:
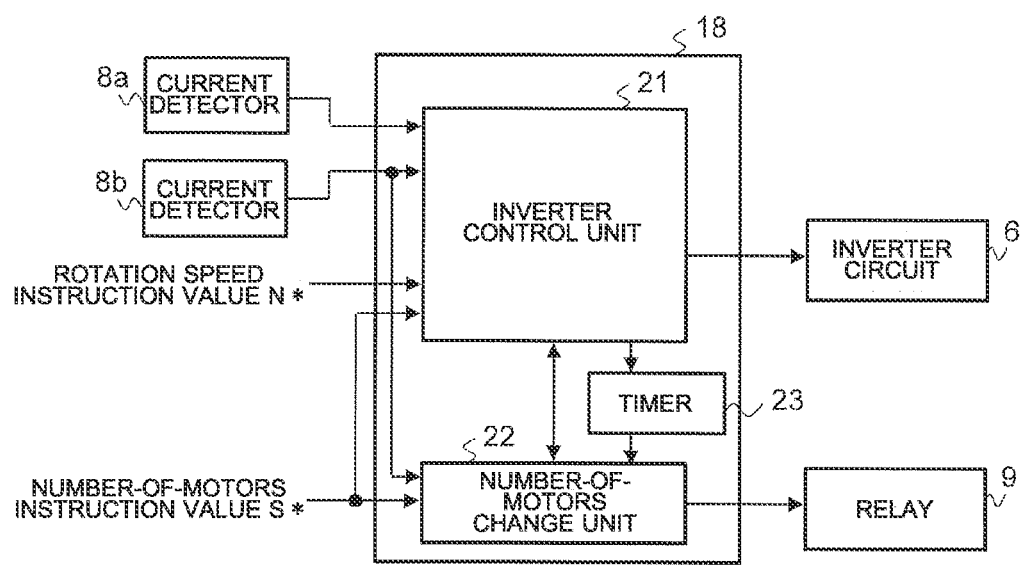
FIG. 2 is a block diagram illustrating a configuration example of a controller illustrated in FIG. 1.

FIG. 2 is a block diagram illustrating a configuration example of the controller illustrated in FIG. 1. The controller 18 is, for example, a microcomputer. As illustrated in FIG. 1, the controller 18 includes a memory 71 storing programs, and a central processing unit (CPU) 72 performing processing based on the programs. As illustrated in FIG. 2, the controller 18 includes an inverter control unit 21, a number-of-motors change unit 22, and a timer 23. When the CPU 72 executes the programs, the inverter control unit 21 and the number-of-motors change unit 22 are implemented.

The inverter control unit 21 controls a rotation speed of each of the plurality of motors 40a and 40b based on a rotation speed instruction value N* input from a host device. In Embodiment 1, the host device is a control device of the air-conditioning device. The inverter control unit 21 performs pulse width modulation (PWM) control to modulate a pulse width of a pulse voltage output from the inverter circuit 6, based on the rotation speed instruction value N*. For example, to increase a motor voltage Va to be input to the motor 40a, the inverter control unit 21 outputs a voltage instruction value Va* instructing increase of the pulse width, to the inverter circuit 6. To decrease the motor voltage Va, the inverter control unit 21 outputs the voltage instruction value Va* instructing decrease of the pulse width, to the inverter circuit 6. The voltage instruction value Va* includes a U-phase voltage instruction value Vu*, a V-phase voltage instruction value Vv*, and a W-phase voltage instruction value Vw*. The inverter control unit 21 is connected to both ends of the smoothing capacitor 5 through unillustrated wires, and motors a both-end voltage (direct-current bus-bar voltage) of the smoothing capacitor 5.

Further, the inverter control unit 21 receives a number-of-motors instruction value S* that is information indicating the number of motors to be driven, from the host device. When receiving the number-of-motors instruction value S* that instructs driving of one motor in a state where the motors 40a and 40b are driven, the inverter control unit 21 makes the current supplied to each of the motors 40a and 40b smaller than a current value instruction value corresponding to the rotation speed instruction value N*. When receiving the number-of-motors instruction value S* that instructs driving of two motors in a state where the motor 40a is driven, the inverter control unit 21 makes a rotation speed Na of the motor 40a smaller than the rotation speed instruction value N*. The number-of-motors change unit 22 controls the on state and the off state of the relay 9 based on the number of motors instructed by the number-of-motors instruction value S* input from the host device.

To control the rotation speed of each of the motors 40a and 40b, the inverter control unit 21 controls the pulse voltage and the carrier frequency to desired values by controlling a width of the pulse voltage output to the switching elements 7 and output timing of the pulse voltage. The inverter control unit 21 performs rotation feedback control to drive the motors 40a and 40b at desired rotation speeds. In Embodiment 1, a reference motor of the rotation feedback control driving the motor at the desired rotation speed is defined as the motor 40a not connected to the relay 9. Therefore, to decrease the motor current Imb flowing through the motor 40b, the inverter control unit 21 performs control to decrease the motor current Ima flowing through the motor 40a.

As the rotation feedback control performed by the inverter control unit 21, two control methods are considered. A first control method is a method in which a magnetic sensor detecting magnetic pole positions of the permanent magnet of the rotor is provided in the motor 40a, and the rotation of the motor 40a is controlled based on the magnetic pole positions detected by the magnetic sensor. A second control method is sensorless vector control in which the magnetic pole positions are estimated from the motor voltage applied to the motor 40a, motor parameters, and the like, and the rotation of the motor 40a is controlled. In Embodiment 1, a case where the inverter control unit 21 performs the sensorless vector control estimating rotation positions of the motors 40a and 40b based on the motor currents detected by the current detectors 8a and 8b, and the like is described.

In the sensorless vector control, the inverter control unit 21 estimates the magnetic pole positions and speeds of the motors 40a and 40b from information about the currents flowing through the motors 40a and 40b, the voltages applied to the motors 40a and 40b, and the motor parameters. The motor parameters include information about a resistance value, an inductance value, an induced voltage constant, and an inertia moment.

Figure 3:
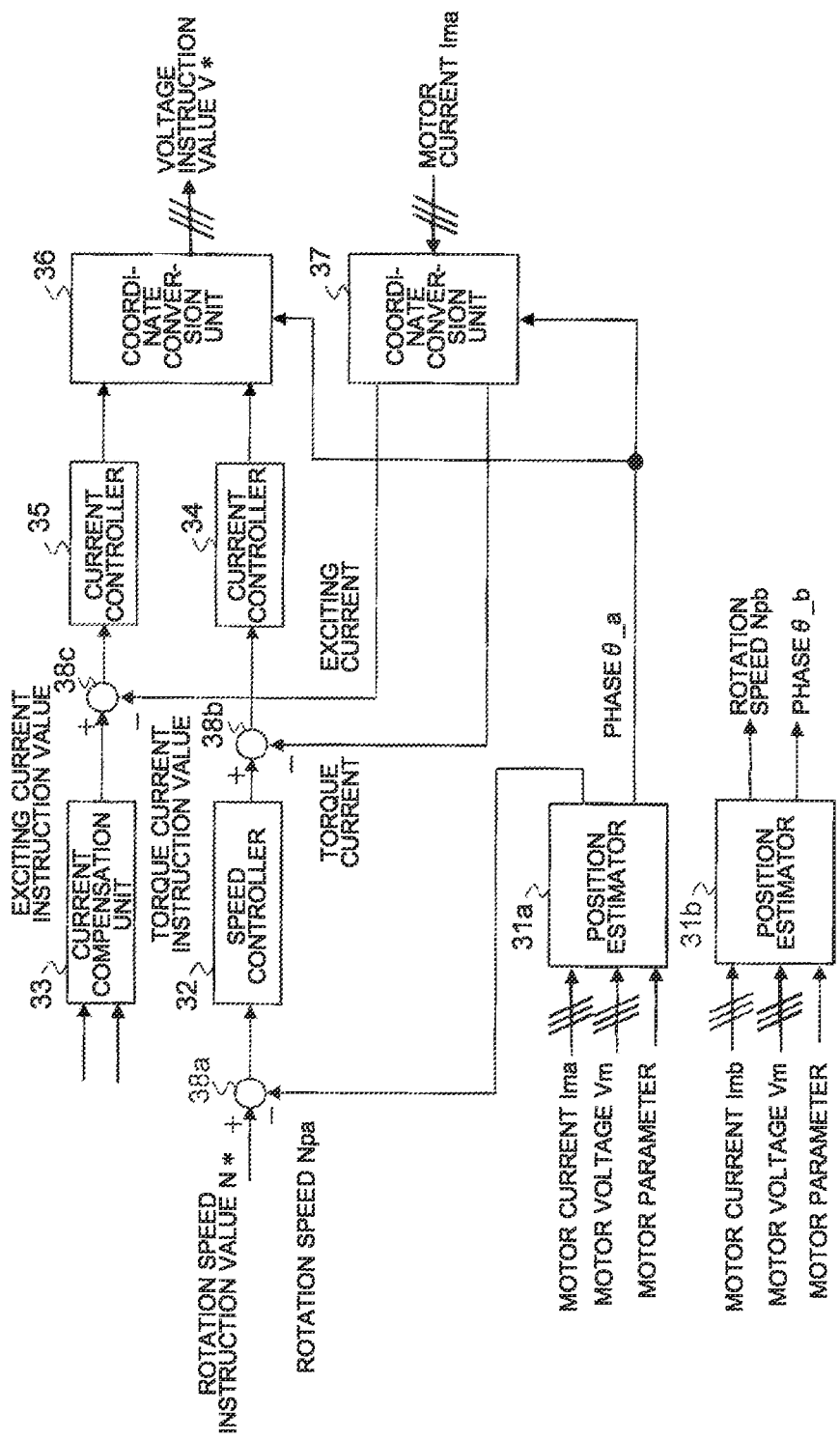
FIG. 3 is a block diagram explaining sensorless vector control performed by an inverter control unit illustrated in FIG. 2.

FIG. 3 is a block diagram explaining the sensorless vector control performed by the inverter control unit illustrated in FIG. 2. As illustrated in FIG. 3, the inverter control unit 21 includes position estimators 31a and 31b, a speed controller 32, a current compensation unit 33, current controllers 34 and 35, coordinate conversion units 36 and 37, and subtractors 38a to 38c.

The number of provided position estimators corresponds to the number of motors synchronously driven. In Embodiment 1, since the motors to be controlled are the two motors 40a and 40b, the inverter control unit 21 includes the position estimator 31a corresponding to the motor 40a and the position estimator 31b corresponding to the motor 40b.

The position estimator 31a estimates a phase $\theta\_a$ and the speed of the motor 40a based on parameter values including the motor current Ima, a motor voltage Vm, and the motor parameters. The motor current Ima is input from the current detector 8a. The motor current Ima includes a U-phase current Iua, a V-phase current Iva, and a W-phase current Iwa. The motor voltage Vm includes, for example, the U-phase voltage instruction value Vu*, the V-phase voltage instruction value Vv*, and the W-phase voltage instruction value Vw*, and is input from the coordinate conversion unit 36. The position estimator 31a converts the estimated speed into a rotation speed Npa, and outputs the rotation speed Npa to the subtractor 38a. The position estimator 31a outputs the phase $\theta\_a$ to the coordinate conversion units 36 and 37.

The position estimator 31b estimates a phase $\theta\_b$ indicating a rotation position of the motor 40b and the speed of the motor 40b based on parameter values including the motor current Imb, the motor voltage Vm, and the motor parameters. The motor current Imb is input from the current detector 8b. The motor current Imb includes a U-phase current Iub, a V-phase current Ivb, and a W-phase current Iwb. All of the information input to the position estimator 31b is information about the motor 40b. The position estimator 31b may convert the estimated speed into a rotation speed Npb and output the rotation speed Npb.

The subtractor 38a calculates a rotation speed difference that is a difference between the rotation speed instruction value N* input from the host device and the rotation speed Npa input from the position estimator 31a. The subtractor 38a outputs a value of the calculated rotation difference to the speed controller 32. The speed controller 32 calculates one of a control amount obtained by multiplying the rotation speed difference by a gain Kc and a control amount obtained by temporally integrating the rotation difference, or a control amount obtained by adding both of the control amounts. The speed controller 32 outputs the calculated control amount as a torque current instruction value to the subtractor 38b.

The coordinate conversion unit 37 receives the motor current Ima including the U-phase current Iua, the V-phase current Iva, and the W-phase current Iwa, from the current detector 8a. The coordinate conversion unit 37 receives a value of the phase θ_a from the position estimator 31a. The coordinate conversion unit 37 sets a d-axis in a magnetic flux direction of each of the three-phase currents Iua, Iva, and Iwa, and converts the three-phase currents Iua, Iva, and Iwa into an exciting current as a component generating a magnetic flux and a torque current corresponding to a torque of a load. The coordinate conversion unit 37 performs coordinate conversion by using, as phase information, the phase θ_a estimated by the position estimator 31a. The exciting current corresponds to a d-axis current, and the torque current corresponds to a q-axis current. The coordinate conversion unit 37 outputs a value of the torque current to the subtractor 38b, and outputs a value of the exciting current to the subtractor 38c.

The subtractor 38b calculates a q-axis current difference that is a difference between the torque current instruction value input from the speed controller 32 and the torque current input from the coordinate conversion unit 37. The subtractor 38b outputs a value of the calculated q-axis current difference to the current controller 34. The current controller 34 calculates one of a control amount obtained by multiplying the q-axis current difference input from the subtractor 38b by a gain Kd and a control amount obtained by temporally integrating the q-axis current difference, or a control amount obtained by adding both of the control amounts. The current controller 34 outputs the calculated control amount as a q-axis voltage instruction value to the coordinate conversion unit 36. The control amount generated by the current controller 34 corresponds to a first control amount.

The current compensation unit 33 stabilizes rotation of the motor 40b that is not a target of the rotation feedback control, out of the plurality of motors 40a and 40b. The current compensation unit 33 calculates a phase difference of the motor 40b to the motor 40a based on the phase θ_a estimated by the position estimator 31a and the phase θ_b estimated by the position estimator 31b. Further, the current compensation unit 33 estimates speed variation of the motor 40b from the calculated phase difference, and calculates a compensation current to stabilize the rotation of the motor 40b. The current compensation unit 33 outputs the calculated compensation current as an exciting current instruction value for the motor 40a, to the subtractor 38c.

The subtractor 38c calculates a d-axis current difference that is a difference between the exciting current instruction value input from the current compensation unit 33 and the exciting current input from the coordinate conversion unit 37. The subtractor 38c outputs a value of the calculated d-axis current difference to the current controller 35. The current controller 35 outputs, as a d-axis voltage instruction value, one of a control amount obtained by multiplying the d-axis current difference input from the subtractor 38c by a gain Ke and a control amount obtained by temporally integrating the d-axis current difference, or a control amount obtained by adding both of the control amounts, to the coordinate conversion unit 36. The control amount generated by the current controller 35 corresponds to a second control amount.

The coordinate conversion unit 36 receives the value of the phase θ_a from the position estimator 31a, receives the q-axis voltage instruction value from the current controller 34, and receives the d-axis current instruction value from the current controller 35. The coordinate conversion unit 36 performs coordinate conversion from the q-axis voltage instruction value and the d-axis current instruction value into the three-phase voltage instruction value V* by using the phase θ_a as the phase information. The inverter control unit 21 converts the three-phase voltage instruction value V* into the pulse voltage in which an on time of the switching elements 7 becomes the pulse width at a period T of the carrier frequency, and outputs the pulse voltage to the inverter circuit 6. The pulse voltage of the phase corresponding to the magnetic pole positions of the rotor of the motor 40a is input to the switching elements 7 of the inverter circuit 6. The inverter circuit 6 can output a desired inverter output voltage.

The inverter control unit 21 feeds back the information on the phase and the speed of the motor 40a estimated by the position estimator 31a in the above-described manner, thereby driving each of the motors 40a and 40b at the desired rotation speed corresponding to the rotation speed instruction value N*. Further, in the case where the plurality of motors 40a and 40b are driven, the position estimators of the number corresponding to the number of motors are provided and the current compensation is performed, which makes it possible to improve stability of the control. Further, for example, in a case where damping characteristics of the motor load are large or the inertia moment is large in the control system driving the plurality of motors, the rotation speed can be stably controlled without performing the above-described current compensation. Therefore, the system of driving the plurality of motors may be constructed without the current compensation unit 33. In this case, the exciting current instruction value is commonly set to an optimum value from a perspective of efficiency.

The position estimators 31a and 31b, the speed controller 32, the current compensation unit 33, the current controllers 34 and 35, the coordinate conversion units 36 and 37, and the subtractors 38a to 38c are implemented when the CPU 72 illustrated in FIG. 1 executes the programs. Some or all of these devices may be dedicated circuits such as application specific integrated circuits (ASICs). Further, in Embodiment 1, the position estimators 31a and 31b are described as different devices for description; however, these devices may be configured as one position estimator. Further, the current controllers 34 and 35 may be configured as one current controller, and the coordinate conversion units 36 and 37 may be configured as one coordinate conversion unit.

Figure 4:
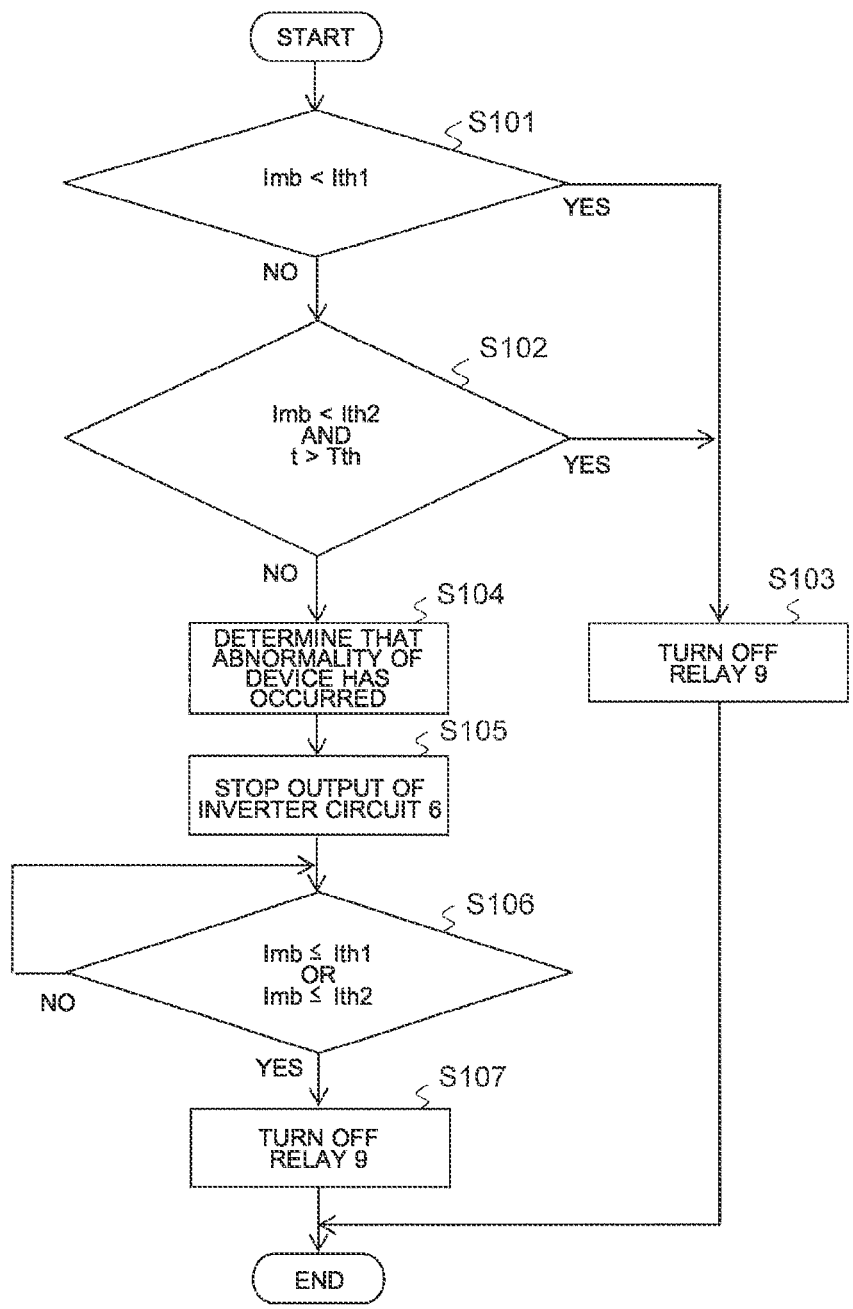
FIG. 4 is a flowchart illustrating an operation procedure in a case where the motor control device illustrated in FIG. 1 reduces the number of motors to be driven from two to one.

Next, operation of the motor control device 30 of Embodiment 1 is described. First, operation in a case where the motor control device 30 reduces the number of motors to be driven from two to one is described. FIG. 4 is a flowchart illustrating an operation procedure in the case where the motor control device illustrated in FIG. 1 reduces the number of motors to be driven from two to one. In this case, a state where the motors 40a and 40b are driven is assumed as an initial state.

When receiving the number-of-motors instruction value S* that instructs driving of one motor, from the host device, the inverter control unit 21 changes the voltage instruction value V* to decrease the motor current Imb. At this time, the inverter control unit 21 activates the timer 23, and causes the timer 23 to measure an elapsed time t. Thereafter, the inverter control unit 21 compares the motor current Imb with a first threshold Ith1 (step S101). For example, the inverter control unit 21 compares the maximum value of the U-phase current Iua, the V-phase current Iva, and the W-phase current Iwa, with the first threshold Ith1. The motor current Imb corresponds to a monitor current for the inverter control unit 21 to determine switching timing of the relay 9.

In a case where the motor current Imb is less than the first threshold Ith1 as a result of the determination in step S101, the number-of-motors change unit 22 turns off the relay 9 (step S103). In contrast, in a case where the motor current Imb is larger than or equal to the first threshold Ith1 as the result of the determination in step S101, the processing by the number-of-motors change unit 22 proceeds to determination processing in step S102.

In step S102, the inverter control unit 21 determines whether the motor current Imb is less than a second threshold Ith2 and the elapsed time t is longer than a threshold time Tth. The threshold time Tth is set to, for example, several seconds. In a case where the motor current Imb is less than the second threshold Ith2 and the elapsed time t is longer than the threshold time Tth seconds, the inverter control unit 21 turns off the relay 9 (step S103). In contrast, in a case where at least one of a first condition that the motor current Imb is less than the second threshold Ith2 and a third condition that the elapsed time t is longer than the threshold time Tth is not satisfied, the inverter control unit 21 determines that abnormality of the device including the motor 40b has occurred (step S104).

In a case where the inverter control unit 21 determines that abnormality of the device has occurred, the inverter control unit 21 stops output of the inverter circuit 6 (step S105). With regard to the operation of the relay 9, the number-of-motors change unit 22 determines whether the motor current Imb detected by the current detector 8b is less than or equal to the second threshold Ith2 or less than or equal to the first threshold Ith1 (step S106). In a case where the motor current Imb is less than or equal to the second threshold Ith2 or less than or equal to the first threshold Ith1 as a result of the determination in step S106, the number-of-motors change unit 22 turns off the relay 9 (step S107).

According to the above-described procedure, when the number of motors to be driven is changed, it is possible to suppress stress generated in the relay 9, and to prevent the relay 9 from breaking down. In addition, according to the above-described procedure, when the number of motors to be driven is changed, it is possible to quickly detect an abnormal state of the device including the motors 40a and 40b and the relay 9. This makes it possible to enhance reliability of the device.

In step S103, when the relay 9 performs the switch operation while the current flows through the relay 9, an arc voltage is generated by the voltage applied to the contact. When the arc voltage is large, the relay 9 may break down. To prevent the stress from being applied to the relay 9, the relay 9 desirably performs the switch operation in a state where the current flowing through the relay 9 is 0 [A]. A method in which the motor current Imb is controlled to 0 [A] and the number-of-motors change unit 22 turns off the relay 9 is described.

Figure 5:
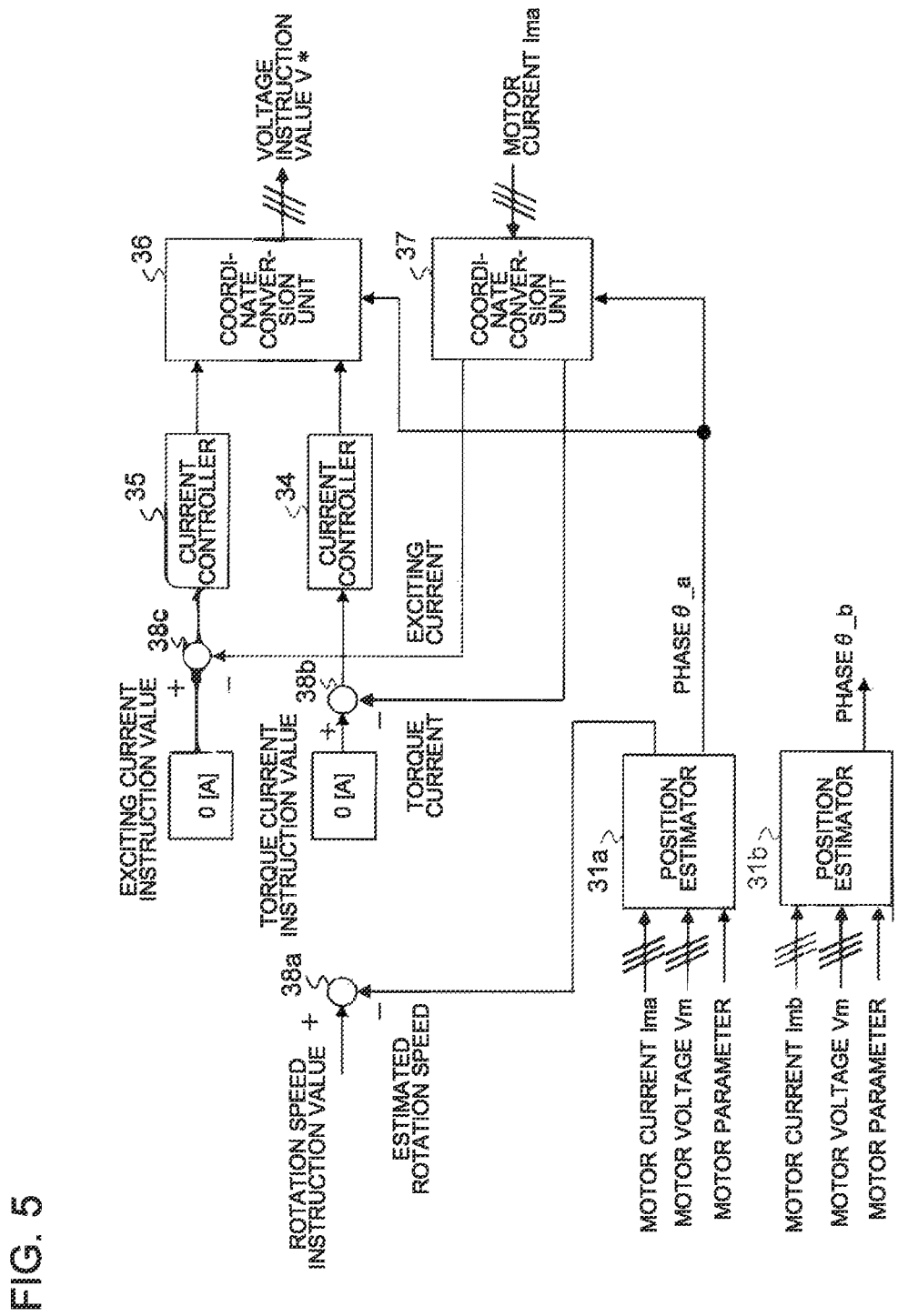
FIG. 5 is a block diagram explaining another control when a relay is switched to an off state in the configuration illustrated in FIG. 3.

FIG. 5 is a block diagram explaining another control when the relay is turned off in the configuration illustrated in FIG. 3. In the configuration illustrated in FIG. 3, the current compensation unit 33 generates the exciting current instruction value, and the speed controller 32 generates the torque current instruction value. FIG. 5 illustrates that the inverter control unit 21 sets each of the exciting current instruction value and the torque current instruction value to 0 [A] at a timing when the number-of-motors instruction value S* that instructs reduction of the number of motors to be driven from two to one is input from the host device. The inverter control unit 21 performs the feedback control to make the current flowing through the motor 40a 0 [A] in a manner illustrated in FIG. 5. The inverter control unit 21 causes the speed controller 32 and the current compensation unit 33 not to function. As a result, the current flowing through the motor 40a becomes 0 [A].

As in Embodiment 1, in the case where the motors 40a and 40b are the permanent magnet synchronous motors, when the magnet of the rotor rotates, the induced voltage is generated inside the winding wire. Generally, the induced voltage is increased as the rotation speed is increased, and the induced voltage is decreased as the rotation speed is decreased. By the above-described control, the inverter output voltage generated by the inverter circuit 6 and the induced voltage generated by rotation of the motor 40b have the same phase and the same value. In this case, the current flowing through the motor 40b becomes 0 [A]. In the configuration illustrated in FIG. 5, the feedback control is performed while each of the exciting current instruction value and the torque current instruction value is set to 0 [A], which automatically generates the inverter output voltage balanced with the induced voltage. Note that the energy supply to the motor 40b is interrupted because the current supplied to the winding wire becomes 0 [A]; however, the motor 40b continues rotation by the inertia moment.

When the purpose is to protect the relay 9, the target to be controlled is the current flowing through the relay 9. In Embodiment 1, however, the target to be controlled in current is the motor 40a, and the relay 9 is not directly controlled to cause the current flowing through the relay 9 to be 0 [A]. However, in the device driving the plurality of motors 40a and 40b by the single inverter circuit 6 as in Embodiment 1, the inverter output voltage is common to the motors 40a and 40b. Therefore, the motors 40a and 40b are definitely controlled at the same rotation speed. Accordingly, in addition to the motor 40a to be controlled in current, the rotation speed of the motor 40b connected to the relay 9 becomes equal to the rotation speed of the motor 40a, and the induced voltages at the same degree are generated in the motors 40a and 40b. As a result, even when zero current control to make the supplied current zero amperes is performed on the motor 40a, it is possible to indirectly make the current flowing through the motor 40b 0 [A].

Further, the current flowing through the relay 9 is equivalent to the current flowing through the motor 40b, and the current flowing through the motor 40b is detected as the motor current Imb by the current detector 8b. Therefore, when the number-of-motors change unit 22 determines that the motor current Imb detected by the current detector 8b is 0 [A], the number-of-motors change unit 22 determines that the relay 9 can be turned off, and changes the coil exciting voltage to the relay 9 to 0 V.

As described above, since the target to be controlled in current is the motor 40a, the current flowing through the motor 40b connected to the relay 9 may not completely become 0 [A], and a minute current may flow through the motor 40b. Further, even when the feedback control is performed while the current instruction value is set to 0 [A], the detected current may not become 0 [A] because an error occurs in control due to influence of a detection error of the current detectors 8a and 8b or other factors. Therefore, the first threshold Ith1 as a determination criterion of connection switching is set to a value including a margin in consideration of these cases.

The second threshold Ith2 is a threshold for determination whether to turn off the relay 9 in a case where the elapsed time t in the control state is longer than the threshold time Tth seconds. If the second threshold Ith2 is set to a large value, stress is applied to the relay 9. Therefore, it is necessary to set the second threshold Ith2 to a value including a margin to a current rated value of the relay 9. If the second threshold Ith2 is set to a value larger than the current rated value of the relay 9, failure risk in the relay 9 is increased. Further, in the present embodiment, the processing basically proceeds to the determination condition in step S102 only in a case where the relay 9 is turned off based on the determination condition in step S101 and the elapsed time t in the state becomes longer than the threshold time Tth seconds due to disturbance or the like. Therefore, frequency of proceeding to step S102 is low. When the second threshold Ith2 is set to a value satisfying the condition of the first threshold Ith1<the second threshold Ith2 and the condition of the second threshold Ith2<the current rated value of the relay 9, it is possible to reduce the failure risk in the device and to rapidly change the number of motors to be driven. As a result, reliability is improved.

Further, as described with reference to FIG. 4, in the case where the processing proceeds to step S104 based on the result of the determination in step S102 and it is determined that abnormality of the device has occurred, the controller 18 stops output of the inverter circuit 6. When the motor current Imb detected by the current detector 8b becomes less than or equal to the second threshold Ith2 or less than or equal to the first threshold Ith1, the controller 18 turns off the relay 9. When the output of the inverter circuit 6 is stopped, the motors 40a and 40b each rotate by inertia, and the current flowing through each of the two motors is decreased with lowering of the rotation speed. Thereafter, when the motor 40b is finally stopped, the current supplied to the motor 40b becomes 0 [A]. In other words, after the controller 18 stops the output of the inverter circuit 6, the controller 18 checks decrease of the motor current Imb, and then turns off the relay 9. As described above, even in the case where the processing proceeds to processing in step S104 illustrated in FIG. 4 due to failure of the inverter circuit 6 or the like, the controller 18 turns off the relay 9 based on the current flowing through the relay 9, which makes it possible to reduce stress applied to the relay 9 and the other devices.

Figure 6:
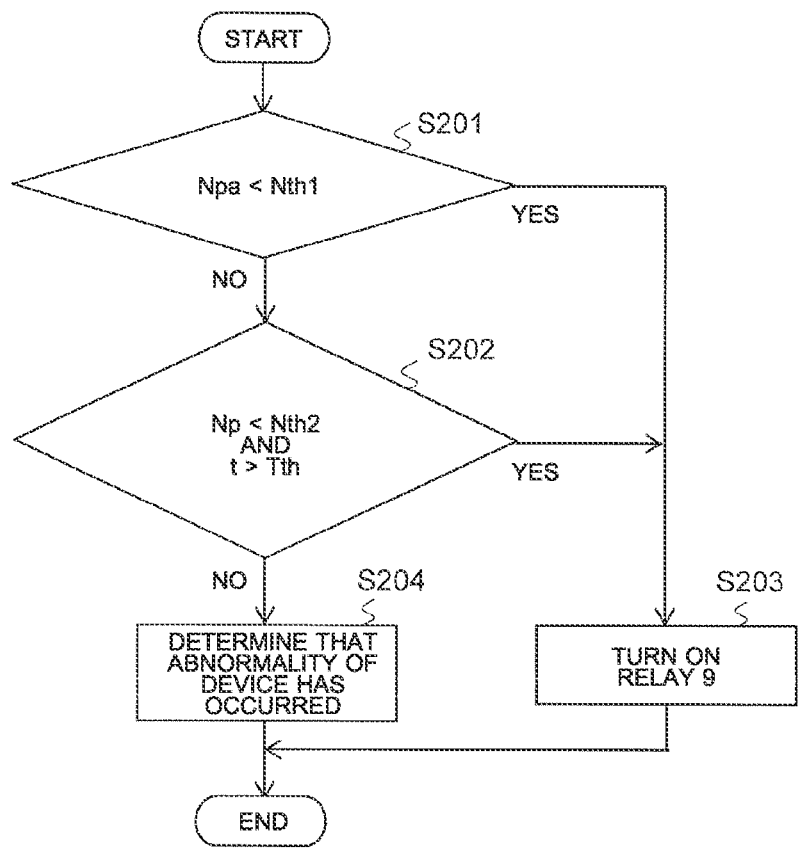
FIG. 6 is a flowchart illustrating an operation procedure in a case where the motor control device illustrated in FIG. 1 increases the number of motors to be driven from one to two.

Next, operation in a case where the motor control device 30 increases the number of motors to be driven from one to two is described. FIG. 6 is a flowchart illustrating an operation procedure in the case where the motor control device illustrated in FIG. 1 increases the number of motors to be driven from one to two. In this case, a state where the motor 40a is driven but the motor 40b is stopped is assumed as the initial state.

When receiving the number-of-motors instruction value S* that instructs driving of two motors, from the host device, the inverter control unit 21 changes the voltage instruction value V* to decrease the rotation speed Npa of the motor 40a. At this time, the inverter control unit 21 activates the timer 23, and causes the timer 23 to measure the elapsed time t. Thereafter, the inverter control unit 21 compares the rotation speed Npa with a first threshold Nth1 (step S201). The rotation speed Npa corresponds to a monitor rotation speed for the inverter control unit 21 to determine switching timing of the relay 9.

In a case where the rotation speed Npa is less than the first threshold Nth1 as a result of the determination in step S201, the number-of-motors change unit 22 turns on the relay 9 (step S203). In contrast, in a case where the rotation speed Npa is larger than or equal to the first threshold Nth1 as the result of the determination in step S201, the processing by the number-of-motors change unit 22 proceeds to determination processing in step S202.

In step S202, the inverter control unit 21 determines whether the rotation speed Npa is less than a second threshold Nth2 and the elapsed time t is longer than the threshold time Tth. In a case where the rotation speed Npa is less than the second threshold Nth2 and the elapsed time t is greater than the threshold time Tth seconds, the inverter control unit 21 turns on the relay 9 (step S203). In contrast, in a case where at least one of a first condition that the rotation speed Npa is less than the second threshold Nth2 and a third condition that the elapsed time t is greater than the threshold time Tth is not satisfied, the inverter control unit 21 determines that abnormality of the device including the motor 40a has occurred (step S204).

According to the above-described procedure, when the number of motors to be driven is changed, it is possible to suppress stress generated in the relay 9, and to prevent the relay 9 and the motor 40b from breaking down. In addition, according to the above-described procedure, when the number of motors to be driven is changed, it is possible to quickly detect an abnormal state of the device including the motors 40a and 40b and the relay 9. This makes it possible to enhance reliability of the device. For example, in a case where the inverter control unit 21 determines in step S204 that abnormality of the device has occurred, the output of the inverter circuit 6 may be stopped. In this case, it is possible to prevent the device in which abnormality has occurred, from influencing the other devices.

When the relay 9 is switched from the off state to the on state in step S203, an excessive current may be generated by the rotation speed of each of the two motors 40a and 40b. In this case, demagnetization of the motor, device failure, or the like may occur. When the relay 9 is switched from the off state to the on state while the motor 40a is driven, the rotation speed N of the motor 40a under driving is desirably set to 0 [min$^{-1}$]. A case where the number-of-motors change unit 22 turns on the relay 9 when the rotation speed Npa is decreased to 0 [min$^{-1}$] is described.

Figure 7:
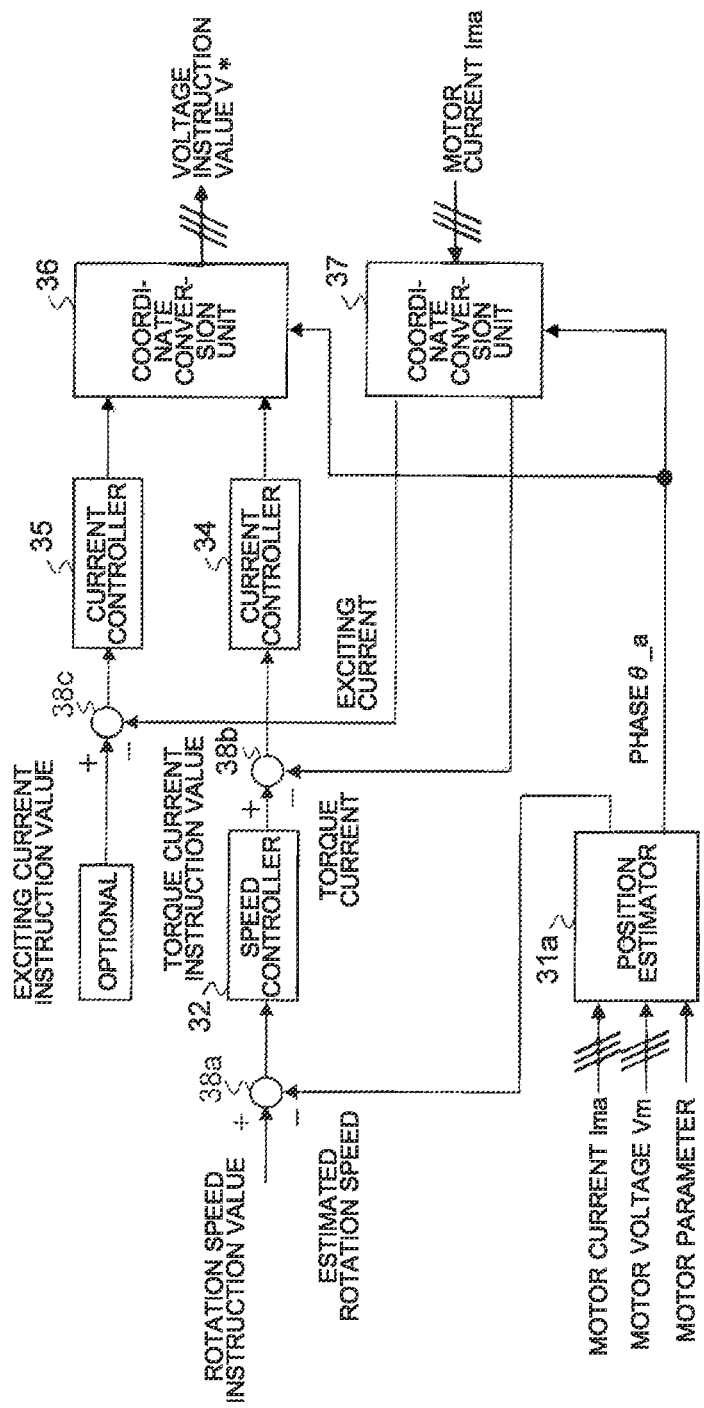
FIG. 7 is a block diagram explaining control in a case where one motor is driven in the configuration illustrated in FIG. 3.

FIG. 7 is a block diagram explaining control in a case where the number of motors to be driven is one in the configuration illustrated in FIG. 3. As compared with the configuration illustrated in FIG. 3, the configuration illustrated in FIG. 7 does not include the position estimator 31b that estimates the rotation position of the motor 40b and the current compensation unit 33 that calculates the compensation current stabilizing driving of the motor 40b, and an optional instruction value is set as the exciting current instruction value. As the optional instruction value, a value corresponding to the types of the motors 40a and 40b is selected. For example, the optional instruction value is desirably set to 0 [A] in a case where the motor to be controlled is a surface magnet motor in which a permanent magnet is provided on a surface of the rotor, and is desirably set to a value at which operation efficiency of the motor becomes the highest in a case where the motor to be controlled is an embedded magnet motor in which a permanent magnet is provided inside the rotor.

Figure 8:
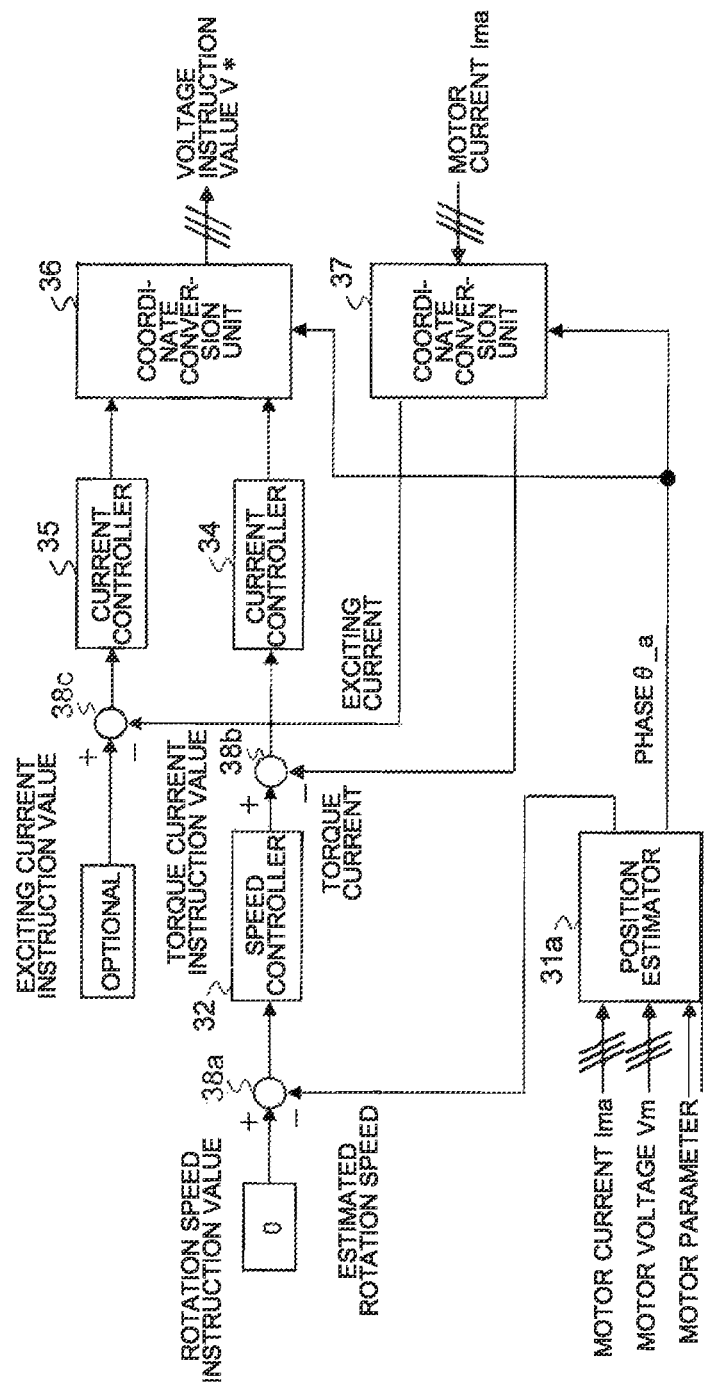
FIG. 8 is a block diagram explaining another control when the relay is switched to an on state in the configuration illustrated in FIG. 7.

FIG. 8 is a block diagram explaining another control when the relay is switched to the on state in the configuration illustrated in FIG. 7. In the case where the host device is the control device of the air-conditioning device, when it is determined that increase of air-conditioning capacity is necessary, the number-of-motors instruction value S* that instructs driving of two motors is input to the controller 18. In this case, as illustrated in FIG. 8, the inverter control unit 21 changes the rotation speed of the motor 40a to zero by setting the rotation speed instruction value to 0 [min$^{-1}$]. In the configuration illustrated in FIG. 7, it is possible to easily change the rotation speed of the motor 40a to zero because the feedback control of the rotation speed of the motor 40a is performed.

The reason why the rotation speed of the motor 40a is reduced to zero is described. When the motor 40a still rotates at a timing when the relay 9 is connected, an excessive current may be generated in the motor 40b due to the induced voltage of the motor 40a at switch operation timing of the relay 9. Therefore, the rotation speed of the motor 40a is set to zero to prevent the excessive current from flowing through the motor 40b. In a case where the current flowing through the motor 40b is large, demagnetization of the motor, failure of the device, and other issues may occur.

When the motor 40b rotates by external force in a free-run state while the relay 9 is in the off state, an instantaneous difference between the induced voltage of the motor 40a and the induced voltage of the motor 40b may be generated as a voltage in the motors. In this case, although a larger current flows through the motors, the rotation speed of the motor 40a is changed to zero, which makes it possible to suppress flow of excessive current.

When the number-of-motors change unit 22 determines that the rotation speed Npa of the motor 40a estimated by the position estimator 31a is 0 [$min^{-1}$], the number-of-motors change unit 22 determines that the relay 9 is switchable to the on state, and applies the exciting voltage to the coil of the relay 9.

However, an error may occur between the estimated value by the position estimator 31a and the actual rotation speed of the motor 40a due to variation of the detected value by the current detector 8a, the motor parameters, and the like. Therefore, the rotation speed threshold Nth that is a criterion of determination whether to perform the switch operation of the relay 9 may be set in consideration of the error.

In the control of the motors, deterioration of controllability on the low speed side, in particular, controllability when the rotation speed is about 0 [$min^{-1}$] is predicted. Further, there is a case where a control algorism is changed based on the rotation speed of the motor. In such a case, a value before the rotation speed of the motor reaches a predetermined value may be defined as a determination threshold of the switching operation of the relay 9. This eliminates necessity for changing the control algorism, and control can be simplified.

Further, since the motors 40a and 40b are connected to the inverter circuit 6 after the relay 9 is changed to the on state, the rotation speeds of the motors 40a and 40b are controlled by the configuration illustrated in FIG. 5.

When the number of motors to be driven is changed from one to two, the relay 9 is switched to the on state after the rotation speed of the motor 40a is controlled to zero. Therefore, it is possible to change the number of motors to be driven out of the motors 40a and 40b while the rotation of the motor 40a is stably maintained. In addition, the excessive current to the relay 9 and the motor 40b is suppressed and the stress to the relay 9 is reduced, which improves reliability of the device including the motors 40a and 40b and the relay 9.

The motor control device 30 of Embodiment 1 includes the inverter circuit 6, the current detectors 8a and 8b respectively detecting the motor currents flowing through the motors 40a and 40b, the relay 9 provided between the motor 40b and the inverter circuit 6, and the controller 18. The controller 18 includes the inverter control unit 21 that decreases the motor current flowing through the motor 40a under driving when the motor 40b is stopped, and the number-of-motors change unit 22 that switches the relay 9 to the on state when the motor current Imb of the motor 40b is reduced. Further, when the number of motors to be driven is changed from one to two, the inverter control unit 21 reduces the rotation speed of the driven motor 40a. When the rotation speed Npa of the motor 40a is reduced, the number-of-motors change unit 22 switches the relay 9 from the off state to the on state.

According to Embodiment 1, when the number of motors to be driven is changed to one out of the motors 40a and 40b under driving, the relay 9 is switched to the off state after the motor current flowing through the motor 40a under driving is reduced. The motors 40a and 40b are connected to the inverter circuit 6 in parallel. Therefore, when the current flowing through the motor 40a is reduced, the current flowing through the motor 40b and the relay 9 is also reduced. After the current flowing through the relay 9 is reduced, the relay 9 is switched to the off state. Moreover, when the number of motors to be driven is changed from one to two out of the motors 40a and 40b, the relay 9 is switched to the on state after the rotation speed of the motor 40a under driving is reduced. The motors 40a and 40b are connected to the inverter circuit 6 in parallel. Therefore, when the rotation speed of the motor 40a is reduced, the current flowing through each of the motors 40a and 40b and the relay 9 is also reduced. After the current flowing through the relay 9 is reduced, the relay 9 is switched to the on state. This makes it possible to reduce the stress applied to the relay 9, and to prevent the device including the motors 40a and 40b and the relay 9 from breaking down. The switching operation of the relay 9 is performed before the current of the motor 40a becomes zero amperes or before the rotation speed of the motor 40a becomes zero. Therefore, it is possible to reduce the switching operation time of the relay 9.

Embodiment 2

In Embodiment 2, a rotation speed condition is added to the number-of-motors change control in the motor control device described in Embodiment 1, to further improve reliability of the device. In Embodiment 2, the components same as the components described in Embodiment 1 are denoted by the same reference numerals, and detailed descriptions of such components are omitted.

A configuration of the motor control device of Embodiment 2 is similar to the configuration described in Embodiment 1. Therefore, a detailed description of the configuration is omitted. Operation of the motor control device of Embodiment 2 is described.

Figure 9:
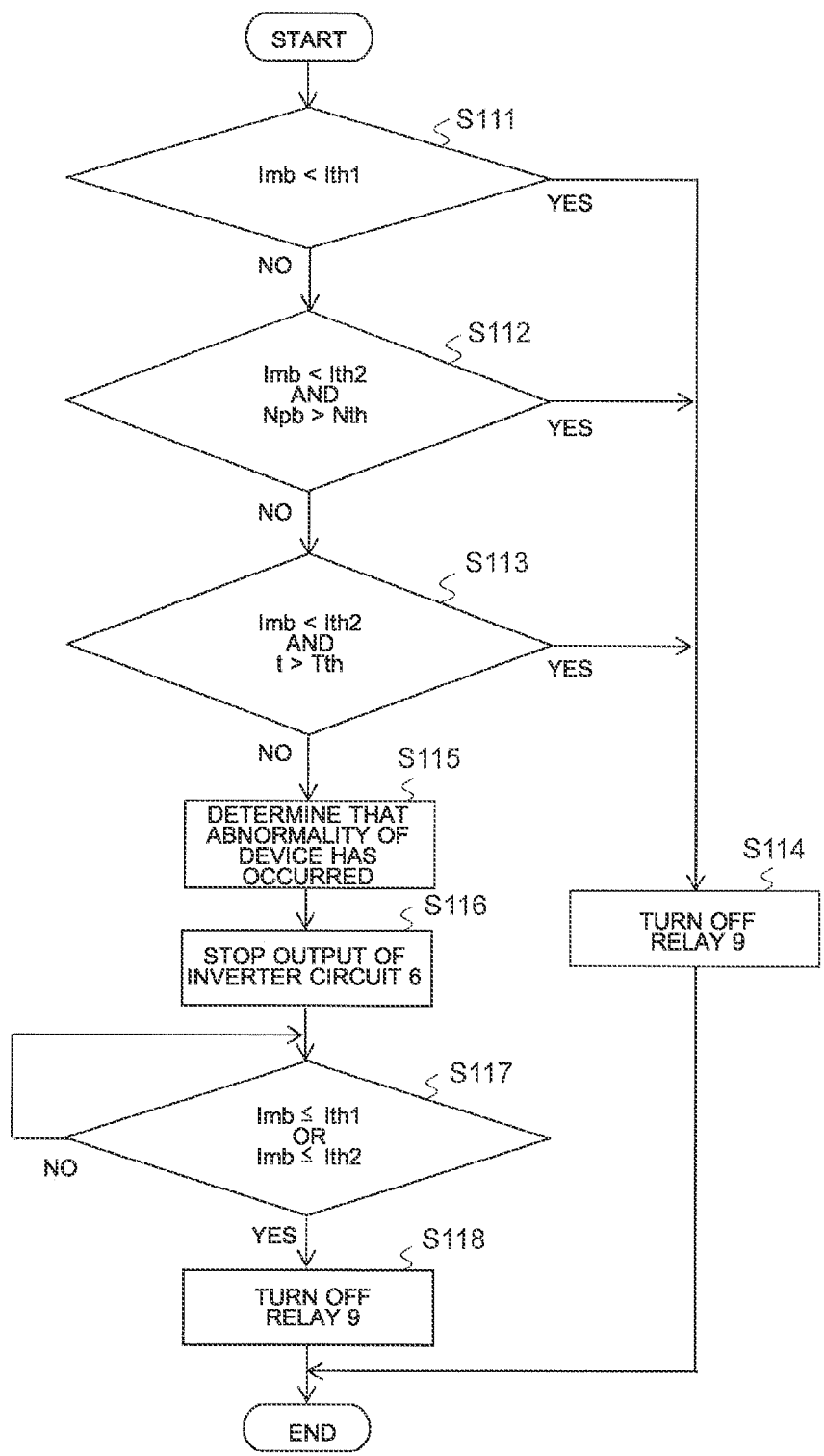
FIG. 9 is a flowchart illustrating an operation procedure in a case where the motor control device illustrated in FIG. 1 reduces the number of motors to be driven from two to one, according to Embodiment 2.

First, operation in a case where the number of motors to be driven is reduced from two to one is described. FIG. 9 is a flowchart illustrating an operation procedure in the case where the motor control device illustrated in FIG. 1 reduces the number of motors to be driven from two to one, according to Embodiment 2. Embodiment 2 is largely different from Embodiment 1 in that step S112 is added to the determination condition for turning off the relay 9.

In step S112 illustrated in FIG. 9, the rotation speed Npa of the motor 40a is used for the determination condition. In a case where both of a condition of the rotation speed Npa of the motor<the rotation speed threshold Nth and a condition of the motor current Imb of the motor 40b<the second threshold Ith2 are satisfied, the relay 9 is turned off. Processing in steps S111, S113, and S114 illustrated in FIG. 9 are respectively similar to the processing in steps S101, S102, and S103 illustrated in FIG. 4. Therefore, detailed descriptions of the processing in steps S111, S113, and S114 are omitted.

In a case where at least one of a first condition that the motor current Imb is less than the second threshold Ith2 and a third condition that the elapsed time t is longer than the threshold time Tth is not satisfied in step S113, the inverter control unit 21 determines that abnormality of the device including the motor 40b has occurred (step S115). When the inverter control unit 21 determines that abnormality of the device has occurred, the inverter control unit 21 stops output of the inverter circuit 6 (step S116). With regard to the operation of the relay 9, the number-of-motors change unit 22 determines whether the motor current Imb detected by the current detector 8b is less than or equal to the second threshold Ith2 or less than or equal to the first threshold Ith1 (step S117). In a case where the motor current Imb is less than or equal to the second threshold Ith2 or less than or equal to the first threshold Ith1 as a result of the determination in step S117, the number-of-motors change unit 22 turns off the relay 9 (step S118).

The reason why the rotation speed Npa of the motor 40a is used for the determination condition is described. As described in Embodiment 1, switching of the control method to a control method in which the motor current is set to zero amperes to reduce the number of motors to be driven from two to one is considered. The control is performed to make the current flowing through the motor 40a 0 [A]. In this case, when the induced voltage generated by rotation of the motor and the voltage generated by the inverter have the same phase and the same value, the current does not flow through the motor. At this time, the motor rotates by inertia, and the rotation speed control is not performed on the motor 40a. However, the rotation speed of the motor 40a can be estimated by calculation operation of the position estimator 31a.

In a case where the rotation speed of the motor is estimated inside the CPU based on the motor constant, the motor current, the motor voltage, and other values as in the sensorless vector control, an error is increased in the estimated rotation speed as the rotation speed becomes low, which deteriorates the estimation accuracy. This is because, when the rotation speed of the motor is decreased, the voltage applied to the motor is also decreased, and estimation of the rotation speed is relatively easily influenced by the voltage error generated in the inverter circuit. In the worst case, a step-out phenomenon occurs in which the motor is brought into a condition where the motor is hard to control, and the device abnormally stops. Further, to prevent the phenomenon, a CPU for advanced calculation processing may be necessary and a high-precision voltage sensor may be necessary, which leads to increase in cost.

As described above, in the case where the number of motors to be driven is changed from two to one, the motor 40a is rotated by inertia, and it is unclear how much the rotation speed of the motor 40a is decreased. In the worst case, the rotation speed may be decreased to a rotation speed causing step-out of the motor. Therefore, it is necessary to perform the number-of-motors change control at a rotation speed higher than the rotation speed causing the step-out of the motor. At this time, the determination threshold Nth for the rotation speed is provided and a value of the determination threshold Nth is set to a value greater than the rotation speed causing the step-out, which makes it possible to avoid the step-out. The reason why the rotation speed is determined based on an AND condition with the determination condition of the motor current Imb<the second threshold Ith2 in step S112 is described. Even when the rotation speed is less than the determination threshold Nth and it is tried to turn off the relay 9, if the flowing current has a large value, stress is applied to the relay 9. Therefore, the processing in step S112 means that the relay 9 is turned off when the condition of the motor current Imb<Ith2 is satisfied. The setting of the second threshold Ith2 of the current is the same as the setting described in Embodiment 1, and a description of the setting of the second threshold Ith2 of the current is omitted.

Further, as described with reference to FIG. 9, in the case where the processing proceeds to step S115 based on the result of the determination in step S113 and the controller 18 determines that abnormality of the device has occurred, the controller 18 stops the output of the inverter circuit 6. In a case where the motor current Imb detected by the current detector 8b becomes less than or equal to the second threshold Ith2 or less than or equal to the first threshold Ith1, the controller 18 turns off the relay 9. When the output of the inverter circuit 6 is stopped, the motors 40a and 40b each rotate by inertia, and the current flowing through the two motors is decreased with decrease of the rotation speed. Thereafter, when the motor 40b is finally stopped, the current supplied to the motor 40b becomes 0 [A]. In other words, after the controller 18 stops the output of the inverter circuit 6, the controller 18 checks decrease of the motor current Imb, and then turns off the relay 9. As described above, even in the case where the processing proceeds to the processing in step S115 illustrated in FIG. 9 due to failure of the inverter circuit 6 or other issues, the controller 18 turns off the relay 9 based on the current flowing through the relay 9, which makes it possible to reduce the stress applied to the relay 9 and the other devices.

Further, in a case where the conditions in steps S111 to S113 are not satisfied, the inverter control unit 21 determines that the device has failed, and immediately stops the voltage output of the inverter circuit 6. This makes it possible to quickly detect an abnormal state of the device.

As described above, when the number of motors to be driven is changed from two to one, the rotation speed Npa of the motor a and the determination threshold for the rotation speed Npa is added, which makes it possible to prevent the rotation speed from being excessively lowered to cause a condition where the motor is hard to control, thereby preventing the device from abnormally stopping.

Figure 10:
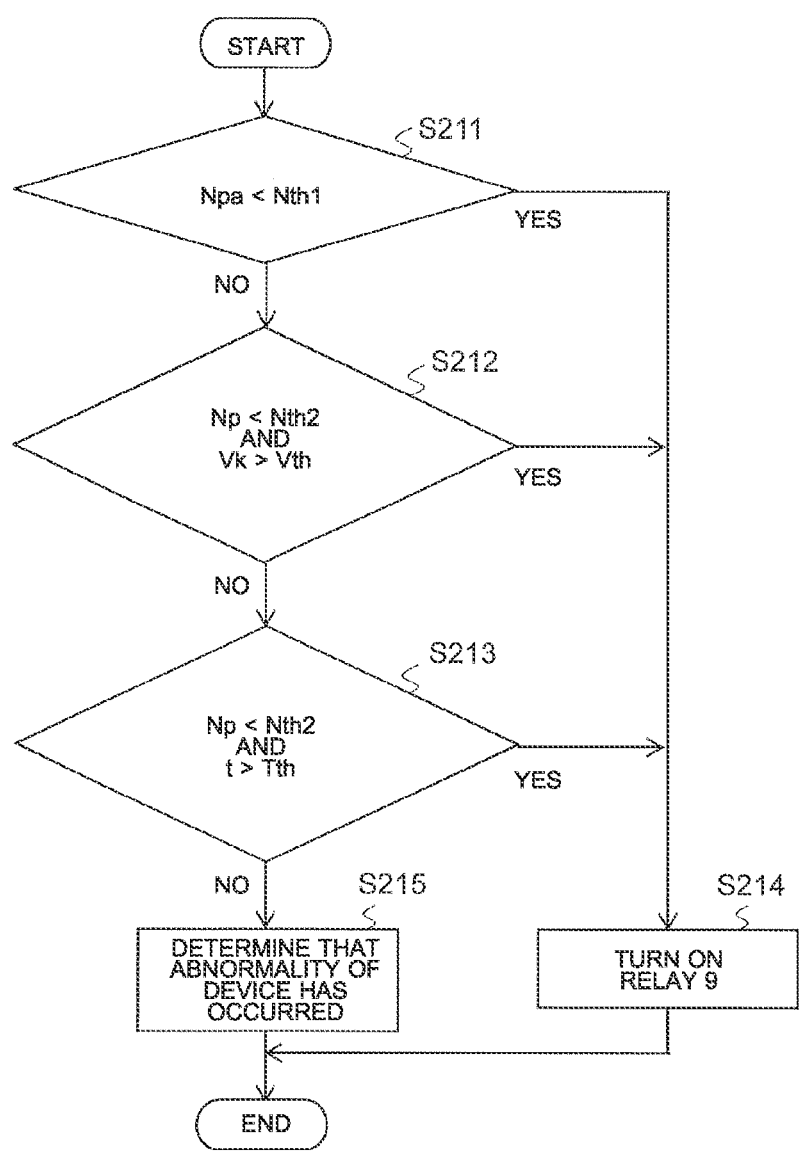
FIG. 10 is a flowchart illustrating an operation procedure in a case where the motor control device in FIG. 1 increases the number of motors to be driven from one to two, according to Embodiment 2.

Next, an operation in the case where the number of motors to be driven is increased from one to two is described. FIG. 10 is a flowchart illustrating an operation procedure in the case where the motor control device illustrated in FIG. 1 increases the number of motors to be driven from one to two, according to Embodiment 2. Embodiment 2 is largely different from Embodiment 1 in that step S212 is added to the determination condition for turning on the relay 9.

In step S212 illustrated in FIG. 10, a voltage threshold Vth as a determination threshold is provided to a regenerative voltage that is the voltage induced from regenerative energy generated by the motor 40a, and in a case where both of a condition of Npa<the rotation speed threshold Nth and a condition of the regenerative voltage Vk<the voltage threshold Vth are satisfied, the relay 9 is turned on. The regenerative voltage Vk is calculated from an increase amount of the both-end voltage (direct-current bus-bar voltage) of the smoothing capacitor 5 of the power conversion circuit 10. Processing in steps S211, S213, S214, and S215 illustrated in FIG. 10 are respectively similar to the processing in steps S201, S202, S203, and S204 illustrated in FIG. 6. Therefore, detailed descriptions of the processing in steps S211, S213, S214, and S215 are omitted.

Also in Embodiment 2, in the case where the number of motors to be driven is increased from one to two, the speed of the motor 40a is controlled to zero, as in Embodiment 1. At this time, the speed is controlled to zero while the motor 40a rotates, energy for rotation is regenerated, and the both-end voltage (direct-current bus-bar voltage) of the smoothing capacitor 5 of the inverter is increased. In a case where the rotation speed is controlled to zero while the motor 40a is rotated by external force, the regenerative energy is excessively increased. As a result, the device detects overvoltage by increase of the direct-current bus-bar voltage, and abnormally stops. Further, in the worst case, the regenerative voltage may exceed a withstand voltage of a part of the smoothing capacitor 5 or exceeds a withstand voltage of a part of each of the switching elements 7, which may cause failure of the device. Therefore, in Embodiment 2, in the zero rotation speed control performed when the number of motors to be driven is increased from one to two, providing the voltage threshold Vth to the direct-current bus-bar voltage enables turning-on of the relay 9 before overvoltage abnormality and device failure occur due to regeneration.

When the voltage threshold Vth is set to a value less than the threshold for detection of overvoltage abnormality of the device, the device can continue the operation without detecting overvoltage abnormality caused by regeneration. Further, in the condition illustrated in step S213, the regenerative voltage is determined based on an AND condition with the determination condition of the rotation speed Npa<the rotation speed threshold Nth. This is to prevent failure due to the excessive current generated in the case where the relay 9 is turned on while the rotation speed is large, as described above. Therefore, when both of the condition of the regenerative voltage Vk<the voltage threshold Vth and the condition of the rotation speed Npa<the rotation speed threshold Nth are satisfied, the failure risk can be reduced and reliability of the entire device can be increased.

Further, in a case where the conditions in steps S211 to S213 are not satisfied, the inverter control unit 21 determines that the device has failed, and immediately stops the voltage output of the inverter circuit 6. This makes it possible to quickly detect an abnormal state of the device.

According to Embodiment 2, when the number of motors to be driven is changed to one among the motors 40a and 40b under driving, not only decreasing the motor current but also adding the determination based on the rotation speed of the motor enable turning-off of the relay 9 before rotation speed of the motor is extremely decreased to cause step-out. As a result, it is possible to stably change the number of motors without abnormal stop of the device. Further, according to Embodiment 2, when the number of motors to be driven is changed from one to two, not only decreasing the rotation speed of the motor but also detecting the regenerative energy of the motor from the increase amount of the direct-current bus-bar voltage enable turning-on of the relay 9 before the overvoltage abnormality occurs. As a result, it is possible to stably change the number of motors without abnormal stop of the device.

Embodiment 3

Embodiment 3 relates to an air-conditioning device including the motor control device described in Embodiment 1. In Embodiment 3, the components same as the components described in Embodiment 1 are denoted by the same reference numerals, and detailed descriptions of such components are omitted.

Figure 11:
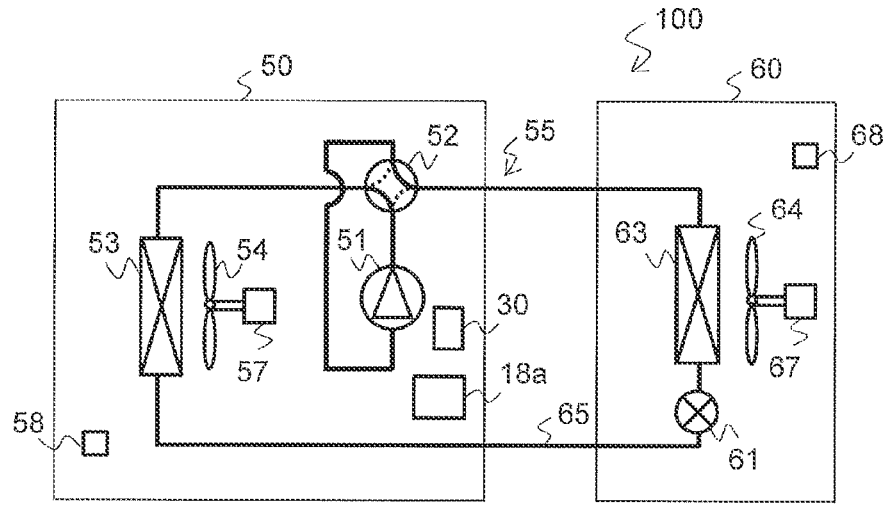
FIG. 11 is a refrigerant circuit diagram illustrating a configuration example of an air-conditioning device according to Embodiment 3 of the present disclosure.

A configuration of the air-conditioning device of Embodiment 3 is described. FIG. 11 is a refrigerant circuit diagram illustrating a configuration example of the air-conditioning device according to Embodiment 3 of the present disclosure. An air-conditioning device 100 includes an outdoor unit 50 and an indoor unit 60 that is connected to the outdoor unit 50 by a refrigerant pipe 65. The outdoor unit 50 includes a compressor 51 that compresses refrigerant and discharges the compressed refrigerant, a four-way valve 52 that switches a flowing direction of the refrigerant, a heat source-side heat exchanger 53 that exchanges heat between the refrigerant and outside air, a heat source-side fan 54 that supplies the outside air to the heat source-side heat exchanger 53, and a controller 18a. The compressor 51 includes the motors 40a and 40b illustrated in FIG. 1. The outdoor unit 50 includes the motor control device 30 described in Embodiment 1. The outdoor unit 50 is provided with an outside air temperature sensor 58 that detects an outside air temperature. A motor 57 is connected as a driving source to the heat source-side fan 54.

The indoor unit 60 includes an expansion device 61 that decompresses and expands high-pressure refrigerant, a load-side heat exchanger 63 that exchanges heat between the refrigerant and air in an air-conditioned space, and a load-side fan 64 that supplies the air in the air-conditioned space to the load-side heat exchanger 63. The indoor unit 60 is provided with a room temperature sensor 68 that detects a room temperature. A motor 67 is connected as a driving source to the load-side fan 64.

The compressor 51, the heat source-side heat exchanger 53, the expansion device 61, and the load-side heat exchanger 63 are connected by the refrigerant pipe 65 to configure a refrigerant circuit 55 through which the refrigerant circulates. In a case where the air-conditioning device 100 performs cooling operation, the heat source-side heat exchanger 53 functions as a condenser, and the load-side heat exchanger 63 functions as an evaporator. In a case where the air-conditioning device 100 performs heating operation, the heat source-side heat exchanger 53 functions as an evaporator, and a load-side heat exchanger 63 functions as a condenser. In the configuration example illustrated in FIG. 11, the controller 18a that has a function of controlling a refrigeration cycle of the air-conditioning device 100 is provided in the outdoor unit 50; however, the controller 18a may be provided in the indoor unit 60.

Figure 12:
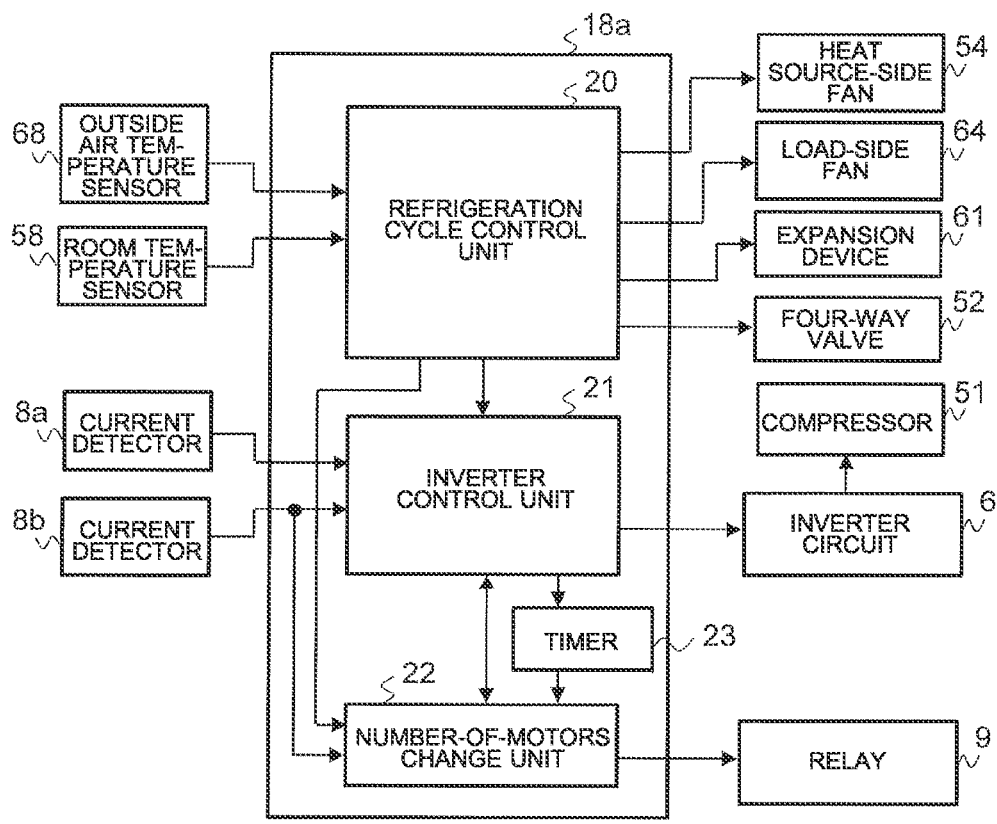
FIG. 12 is a block diagram illustrating a configuration example of a controller illustrated in FIG. 11.

FIG. 12 is a block diagram illustrating a configuration example of the controller illustrated in FIG. 11. The controller 18a includes a refrigeration cycle control unit 20, the inverter control unit 21, and the number-of-motors change unit 22. The controller 18a includes the memory 71 and the CPU 72 illustrated in FIG. 1. When the CPU executes programs, the refrigeration cycle control unit 20, the inverter control unit 21, and the number-of-motors change unit 22 are implemented. Note that, in FIG. 11, the motor control device 30 and the controller 18a are separately illustrated for description; however, the motor control device 30 includes the inverter control unit 21 and the number-of-motors change unit 22 illustrated in FIG. 12.

The refrigeration cycle control unit 20 adjusts a control amount of a refrigerant device such as the compressor 51 and the expansion device 61 such that the air-conditioning device 100 can obtain desired air-conditioning capacity. For example, the refrigeration cycle control unit 20 motors the outside air temperature input from the outside air temperature sensor 58 and the room temperature input from the room temperature sensor 68. When a refrigeration load is increased due to change of one or both of the outside air temperature and the room temperature, the refrigeration cycle control unit 20 calculates necessary air-conditioning capacity. Further, the refrigeration cycle control unit 20 controls a rotation speed of each of the compressor 51, the load-side fan 64, and the heat source-side fan 54, and an opening degree of the expansion device 61 based on the calculated air-conditioning capacity.

In a case where the refrigeration cycle control unit 20 controls the rotation speed of the compressor 51, the refrigeration cycle control unit 20 outputs the rotation speed instruction value N* corresponding to the air-conditioning capacity required for the air-conditioning device 100, to the inverter control unit 21. Further, the refrigeration cycle control unit 20 determines the number of motors to be driven out of the motors 40a and 40b based on the air-conditioning capacity required for the air-conditioning device 100, and outputs the number-of-motors instruction value S* to the inverter control unit 21 and the number-of-motors change unit 22.

The control of the motors 40a and 40b of the compressor 51 in the air-conditioning device 100 of Embodiment 3 is similar to the control described in Embodiment 1. Therefore, a detailed description of the control is omitted. In Embodiment 3, the case where the compressor 51 includes two motors 40a and 40b is described; however, the motors 40a and 40b may be used as the motor 57. Moreover, the motors 40a and 40b may be used as the motor 67. In Embodiment 3, the case where the motor control device described in Embodiment 1 is used is described; however, the motor control device described in Embodiment 2 may be used.

The air-conditioning device 100 of Embodiment 3 includes the refrigerant circuit 55 including the compressor 51, the fan, the motors 40a and 40b connected to one or both of the compressor 51 and the fan, and the motor control device 30.

According to Embodiment 3, when the number of motors to be driven among the plurality of motors is changed, it is possible to maintain stable air-conditioning capacity without stopping the air-conditioning device and influencing operation performance of the air-conditioning device. In addition, it is possible to suppress the stress generated in the relay 9, and to prevent the device including the motors 40a and 40b and the relay 9 from breaking down.

For example, in the case where the number of motors to be driven is changed from two to one, when the current of the motor, driving of which is maintained, is reduced to 0 [A], the air-conditioning capacity of the air-conditioning device 100 is lowered. If the air-conditioning capacity is lowered once, air-conditioning environment of the air-conditioned space may be deteriorated during a period until the air-conditioning capacity is recovered. Further, in a case of the motor having a large inertia moment, even when the output of the inverter circuit is stopped, the motor continuously rotates by the inertia moment. As a result, the motor cannot be reactivated in some cases, and a stop time may become long. In contrast, in Embodiment 3, when the number of motors to be driven is changed out of the plurality of motors, the current of the motor to be driven is reduced; however, the current is not reduced to zero amperes and the air-conditioning device 100 is not stopped. This makes it possible to maintain the stable air-conditioning capacity.

In Embodiment 3, in the case where the number of motors to be driven is changed from two to one, the relay 9 may be turned off after the current is controlled to 0 [A]. Further, in the case where the number of motors to be driven is changed from one to two, the relay 9 may be turned on after the rotation speed of the motor under driving is controlled to zero. In this case, the switching operation of the motors 40a and 40b is performable while the air-conditioning capacity of the air-conditioning device 100 is stably maintained, which makes it possible to avoid stop of the air-conditioning device 100. Further, flow of the excessive current to the motor 40b and the relay 9 can be suppressed, and the stress to the relay 9 can be reduced. As a result, reliability of the device including the motors 40a and 40b and the relay 9, and reliability of the air-conditioning device 100 are improved. Since the relay 9 performs the switching operation before the current of the motor 40a becomes zero amperes or before the rotation speed of the motor 40a becomes zero, it is possible to reduce the switching operation time of the relay 9.

Applying the procedure described with reference to FIG. 4 and FIG. 6 in Embodiment 1 to Embodiment 3 makes it possible to quickly detect the abnormal state of the device including the motors 40a and 40b and the relay 9. This makes it possible to further enhance reliability of the air-conditioning device 100.

Further, the fact that the air-conditioning device 100 of Embodiment 3 solves the issues of the related-art technology is described. As described as the related-art technology, the air-conditioning device including the plurality of motors to drive a motor having a large capacity along with increase in air-conditioning capacity has been known. In the case where the permanent magnet synchronous motor is driven, a method in which magnetic pole positions of the rotor and the current flowing through each of the motors are detected by detectors such as a magnetic pole sensor, and the rotation speed of each of the motors is controlled is commonly used. However, the magnetic pole sensor cannot be attached in some cases because an inside of the compressor provided in the air-conditioning device becomes high temperature and high pressure. Therefore, sensorless control that estimates the magnetic pole positions and controls the rotation speed of each of the motors has been proposed. In the sensorless control, the magnetic pole sensor is unnecessary. Therefore, the configuration of the air-conditioning device becomes more inexpensive. Further, the sensorless control is applicable not only to the control of the compressor motor but also to control of a fan motor.

In a case of the device in which a plurality of permanent magnet synchronous motors are connected, however, it is necessary to control the motors at respective appropriate phases corresponding to the magnetic pole positions, and a device in which one inverter circuit is adopted for one motor is commonly used. Therefore, the device including the plurality of motors requires the inverter circuits of the number corresponding to the number of motors. In contrast, in the technologies disclosed in Patent Literature 1 and Patent Literature 2, the plurality of motors are driven by one inverter circuit.

In a case where the air-conditioning load is decreased, the related-art air-conditioning device controls the inverter circuit to reduce the rotation speed of the motor of the outdoor fan. In contrast, the air-conditioning device including the plurality of motors like the air-conditioning device disclosed in Patent Literature 1 lowers an air volume by reducing the number of motors to be driven in place of reduction of the rotation speed of the motor.

In the method disclosed in Patent Literature 2, the number of motors to be driven is changed by controlling an electromagnetic relay that is provided between the inverter circuit and the motor to change the number of motors to be driven, to disconnect the motor from the inverter circuit. In the case where the contact is turned off in the state where the current flows through the electromagnetic relay, however, an ark occurs on the contact of the electromagnetic relay as described above, which applies stress to the electromagnetic relay.

Further, a case where the technology disclosed in Patent Literature 2 is applied to an air-conditioning device is considered. In this case, when an air conditioning load is increased and the number of motors to be driven is changed from one to two, it is necessary for the air-conditioning device to turn on the electromagnetic relay. At this time, if the second motor is connected to the inverter circuit while the air-conditioning device controls rotation of the first motor, magnetic poles of the rotor may not follow the frequency of the inverter circuit, which may cause a condition where the motor is hard to control such as step-out. As a result, the device abnormally stops.

In a case where the air-conditioning device including the motor control device that drives the plurality of permanent magnet synchronous motors performs operation while performing control to change the number of motors to be driven, the air-conditioning device desirably change the number of motors to be driven in a short time not to lower the air-conditioning capacity as much as possible. Further, it is necessary for the motor control device to perform the change operation of the motors to be driven not to apply stress such as overcurrent and overvoltage to the electromagnetic relay and the motors.

The air-conditioning device 100 of Embodiment 3 can solve such related-art issues in the above-described manner.

REFERENCE SIGNS LIST

1: alternating-current power supply, 2: rectifier circuit, 3: backflow prevention element, 4: reactor, 5: smoothing capacitor, 6: inverter circuit, 7: switching element, 8a, 8b: current detector, 9: relay, 10: power conversion circuit, 11: freewheeling diode, 18, 18a: controller, 20: refrigeration cycle control unit, 21: inverter control unit, 22: number-of-motors change unit, 23: timer, 30: motor control device, 31a, 31b: position estimator, 32: speed controller, 33: current compensation unit, 34, 35: current controller, 36, 37: coordinate conversion unit, 38a to 38c: subtractor, 40a, 40b: motor, 50: outdoor unit, 51: compressor, 52: four-way valve, 53: heat source-side heat exchanger, 54: heat source-side fan, 55: refrigerant circuit, 57: motor, 58: outside air temperature sensor, 60: indoor unit, 61: expansion device, 63: load-side heat exchanger, 64: load-side fan, 65: refrigerant pipe, 67: motor, 68: room temperature sensor, 71: memory, 72: CPU, 100: air-conditioning device

The invention claimed is:

1. A motor control device, comprising:
an inverter circuit configured to convert a direct-current voltage into an alternating-current voltage, and to supply the alternating-current voltage to a plurality of motors connected in parallel;
current detectors configured to detect motor currents flowing through the respective motors;
a relay provided between at least one of the plurality of motors and the inverter circuit and configured to switch an on state and an off state of connection between the one motor and the inverter circuit; and
a controller configured to change number of motors to be driven out of the plurality of motors, wherein
the controller lowers, when one of two or more motors under driving is stopped, a current instruction value to the two or more motors under driving, and switches, when a monitor current that is the motor current detected by the current detector of the motor connected to the relay is decreased, the relay connected to a motor to be stopped, from the on state to the off state.

2. The motor control device of claim 1, wherein the controller compares the monitor current with a determined first threshold, and in a case where the monitor current is less than the first threshold, the number-of-motors change unit switches the relay from the on state to the off state.

3. The motor control device of claim 2, wherein
the controller calculates an exciting current instruction value to stabilize rotation of the motor to be stopped, based on a phase difference between a phase estimated from the motor current of the motor under driving and a phase estimated from the monitor current, calculates a torque current instruction value based on a rotation speed difference between a rotation speed instruction value and a rotation speed estimated from a parameter value including the motor current of the motor under driving, calculates a first control amount from a current difference between the torque current instruction value and a torque current corresponding to the motor current of the motor under driving, and calculates a second control amount from a current difference between the exciting current instruction value and an exciting current corresponding to the motor current of the motor under driving, the coordinate conversion unit generating a voltage instruction value to be output to the inverter circuit, based on the first control amount and the second control amount,
when the one motor is stopped, the controller stops the calculation of the exciting current instruction value and the calculation of the torque current instruction value, and
when the monitor current is reduced to the first threshold, the controller switches the relay from the on state to the off state.

4. The motor control device of claim 2, wherein
the controller estimates a rotation speed of the motor connected to the relay, based on the monitor current,
in a case where the monitor current is larger than or equal to the first threshold, the controller compares the monitor current with a second threshold greater than the first threshold and compares the rotation speed estimated with a determined rotation speed threshold, and
in a case where both of a first condition that the monitor current is less than the second threshold and a second condition that the estimated rotation speed is less than the rotation speed threshold are satisfied, the number-of-motors change unit switches the relay from the on state to the off state.

5. The motor control device of claim 4, wherein
the controller includes a timer measuring an elapsed time after reduction of the motor currents flowing through the two or more motors under driving,
in a case where at least one of the first condition and the second condition is not satisfied, the controller compares the elapsed time with a determined threshold time,
in a case where both of the first condition and a third condition that the elapsed time is longer than the threshold time are satisfied, the controller switches the relay from the on state to the off state, and
in a case where at least one of the first condition and the third condition is not satisfied, the controller determines that a device including the motor connected to the relay has abnormality.

6. An air-conditioning device, comprising:
a refrigerant circuit through which refrigerant circulates, the refrigerant circuit including a compressor, a condenser, an expansion device, and an evaporator that are connected to one another;
a fan configured to supply air to at least one of the condenser and the evaporator;
the plurality of motors connected to one or both of the compressor and the fan; and
the motor control device of claim 1.

7. A motor control device, comprising:
an inverter circuit configured to convert a direct-current voltage into an alternating-current voltage, and to supply the alternating-current voltage to a plurality of motors connected in parallel;
current detectors configured to detect motor currents flowing through the respective motors;
a relay provided between at least one of the plurality of motors and the inverter circuit and configured to switch an on state and an off state of connection between the one motor and the inverter circuit; and
a controller configured to change number of motors to be driven from the plurality of motors, wherein
the controller makes a rotation speed of a motor under driving smaller than a rotation speed instruction value when the number of motors to be driven is increased by one, and switches when a monitor rotation speed that is a rotation speed estimated from the motor current detected by the current detector of the motor under driving is less than the rotation speed instruction value, the relay connected to a motor to be activated, from the off state to the on state.

8. The motor control device of claim 7, wherein
the controller compares the monitor rotation speed with a determined first threshold, and
in a case where the monitor rotation speed is less than the first threshold, the number-of-motors change unit switches the relay from the off state to the on state.

9. The motor control device of claim 8, wherein
the controller calculates a torque current instruction value based on a rotation speed difference between the rotation speed instruction value and a rotation speed estimated from a parameter value including the motor current of the motor under driving, calculates a first control amount from a current difference between the torque current instruction value and a torque current corresponding to the motor current of the motor under driving, and calculates a second control amount from a current difference between a value corresponding to a type of the plurality of motors and an exciting current corresponding to the motor current of the motor under driving, generates a voltage instruction value to be output to the inverter circuit, based on the first control amount and the second control amount,
when the number of motors to be driven is increased by one, the controller sets the rotation speed instruction value to zero, and
when the monitor rotation speed is reduced to the first threshold, the controller switches the relay from the off state to the on state.

10. The motor control device of claim 8, wherein
the controller estimates a regenerative voltage based on the motor current detected by the current detector of a motor under driving,
in a case where the monitor rotation speed is greater than or equal to the first threshold, the controller compares the monitor rotation speed with a second threshold greater than the first threshold, and compares the regenerative voltage estimated by the inverter control unit with a determined voltage threshold, and
in a case where both of a first condition that the monitor rotation speed is less than the second threshold and a second condition that the estimated regenerative voltage is greater than the voltage threshold are satisfied, the controller switches the relay from the off state to the on state.

11. The motor control device of claim 10, wherein
the controller includes a timer measuring an elapsed time after reduction of the motor current flowing through the motor under driving,
in a case where at least one of the first condition and the second condition is not satisfied, the controller compares the elapsed time with a determined threshold time,
in a case where both of the first condition and a third condition that the elapsed time is greater than the threshold time are satisfied, the controller switches the relay from the off state to the on state, and
in a case where at least one of the first condition and the third condition is not satisfied, the controller determines that a device including the motor under driving has abnormality.

* * * * *